US010721157B2

(12) United States Patent
Bisht et al.

(10) Patent No.: US 10,721,157 B2
(45) Date of Patent: Jul. 21, 2020

(54) MECHANISM TO DETECT DATA PLANE LOOPS IN AN OPENFLOW NETWORK

(71) Applicant: Telefonaktiebolaget LM Ericsson (publ), Stockholm (SE)

(72) Inventors: Ashutosh Bisht, Bangalore (IN); Faseela K, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/482,543

(22) PCT Filed: Feb. 21, 2017

(86) PCT No.: PCT/IB2017/050982
§ 371 (c)(1),
(2) Date: Jul. 31, 2019

(87) PCT Pub. No.: WO2018/154352
PCT Pub. Date: Aug. 30, 2018

(65) Prior Publication Data
US 2020/0044959 A1 Feb. 6, 2020

(51) Int. Cl.
*H04L 12/28* (2006.01)
*H04L 12/705* (2013.01)
(Continued)

(52) U.S. Cl.
CPC .......... *H04L 45/18* (2013.01); *H04L 49/3009* (2013.01); *H04L 49/3063* (2013.01)

(58) Field of Classification Search
CPC .......... H04L 49/351; H04L 2012/6443; H04L 45/18
(Continued)

(56) References Cited

U.S. PATENT DOCUMENTS

2002/0176370 A1* 11/2002 Ohba ............... H04L 49/309
370/252
2015/0103830 A1* 4/2015 Kampmann ............ H04L 12/42
370/392
(Continued)

FOREIGN PATENT DOCUMENTS

WO 2014046875 A1 3/2014
WO 2017118875 A1 7/2017

OTHER PUBLICATIONS

"NetVirt," OpenDaylight Project, created Apr. 7, 2016, downloaded from https://wiki.opendaylight.org/view/NetVirt on Jul. 31, 2019, 3 pages.
(Continued)

*Primary Examiner* — John Pezzlo
(74) *Attorney, Agent, or Firm* — Sage Patent Group

(57) ABSTRACT

A method is implemented by a network device functioning as a switch in a software defined networking (SDN) network to detect data plane loops in the SDN network. The method includes receiving a packet, setting a value of a packet register associated with the packet to an initial loop count value, performing an arithmetic operation on the packet register to update the value of the packet register to an updated loop count value when the packet is to be resubmitted to a current flow table or a previous flow table of a packet processing pipeline of the switch, and determining that the packet is in a data plane loop in response to a determination that the updated loop count value is an invalid value.

18 Claims, 9 Drawing Sheets

(51) Int. Cl.
*H04L 12/935* (2013.01)
*H04J 1/16* (2006.01)

(58) Field of Classification Search
USPC .......................................... 370/252, 389, 386
See application file for complete search history.

(56) References Cited

U.S. PATENT DOCUMENTS

2016/0112328 A1    4/2016  Anand
2017/0250869 A1*   8/2017  Voellmy .............. H04L 41/0893

OTHER PUBLICATIONS

"OpenFlow Switch Specification; Version 1.5.0 (Protocol version 0x06)," Open Networking Foundation, Dec. 19, 2014, pp. 1-277.
"Ryu Documentation," Release 4.2, ryu development team, Jul. 21, 2016, downloaded from https://buildmedia.readthedocs.org/media/pdf/ryu-ippouzumi/stableiryu-ippouzumi.pdf on Jul. 31, 2019, pp. 1-99.

* cited by examiner

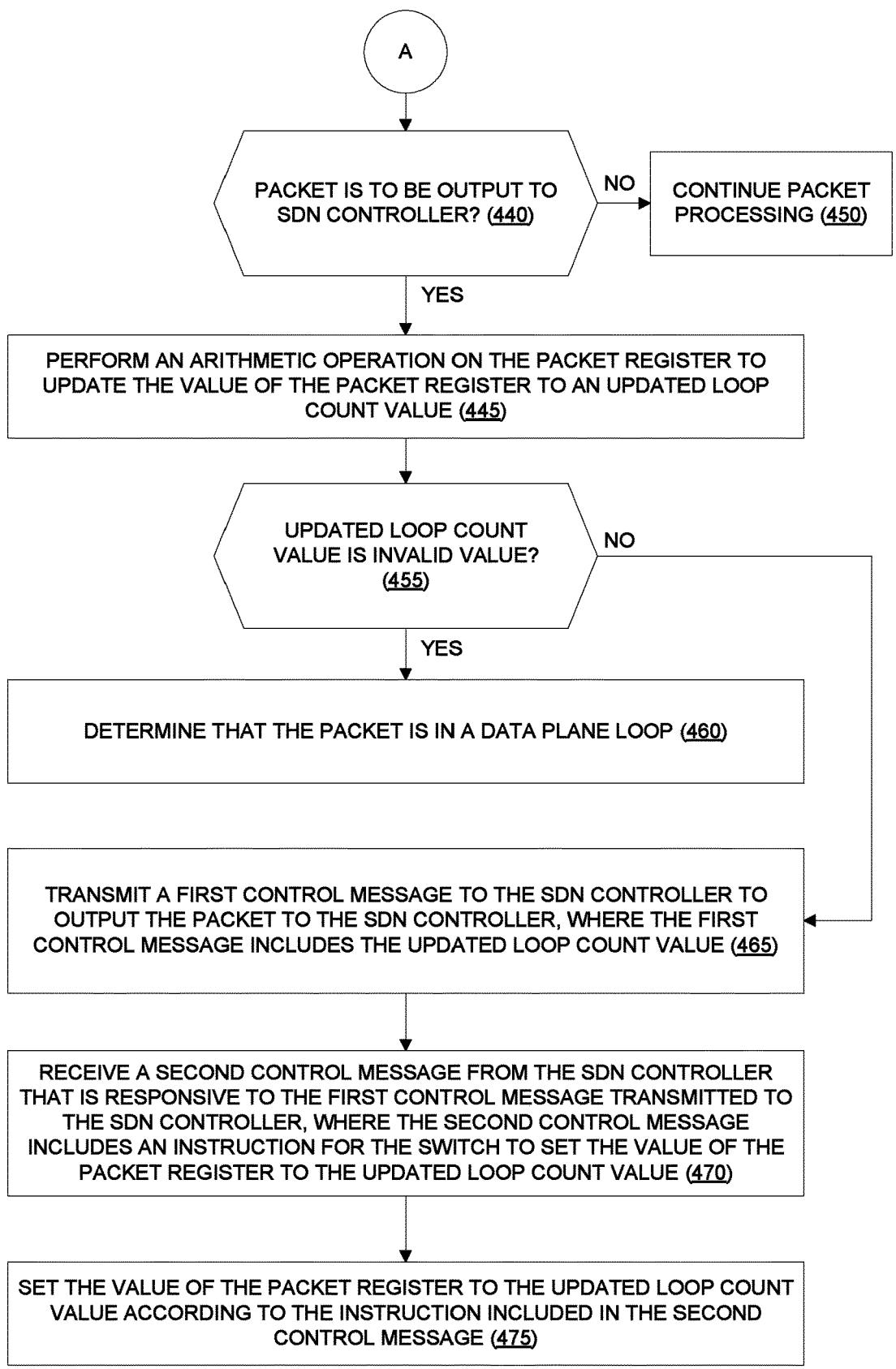
FIG. 4 (CONT')

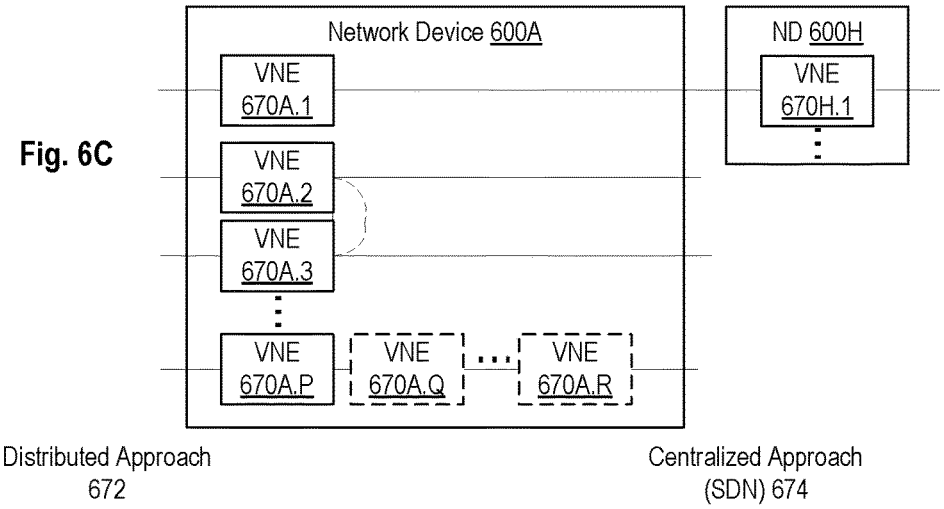
Fig. 6C
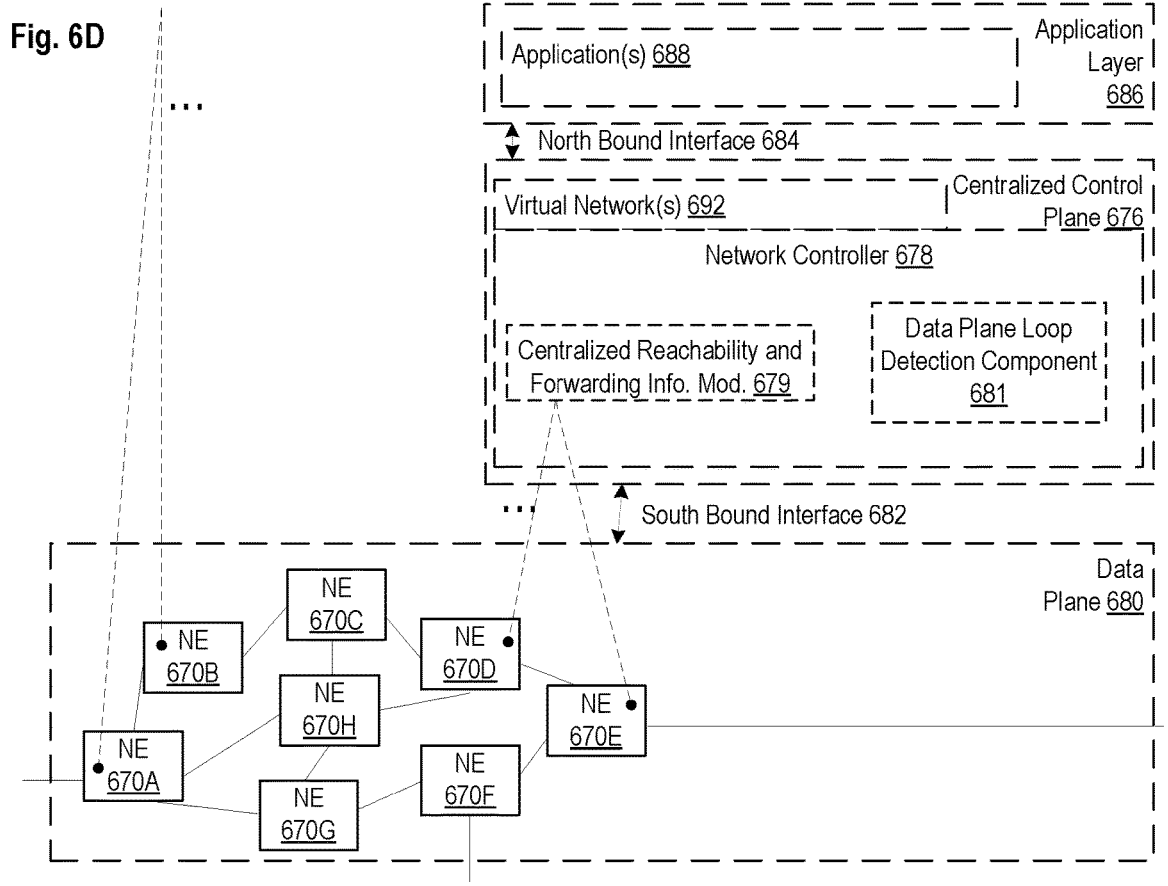
Fig. 6D
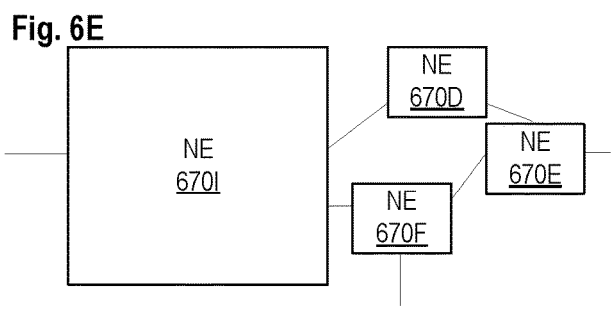
Fig. 6E
Fig. 6F

US 10,721,157 B2

MECHANISM TO DETECT DATA PLANE LOOPS IN AN OPENFLOW NETWORK

CROSS-REFERENCE TO RELATED APPLICATIONS

This application is a national stage of International Application No. PCT/IB2017/050982, filed Feb. 21, 2017, which is hereby incorporated by reference.

TECHNICAL FIELD

Embodiments of the invention relate to the field of Software Defined Networking (SDN), and more specifically, to detecting data plane loops in an SDN network.

BACKGROUND

Software Defined Networking (SDN) is an approach to computer networking that employs a split architecture network in which the forwarding plane (or data plane) is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

OpenFlow is a protocol that enables controllers and switches in an SDN network to communicate with each other. OpenFlow enables dynamic programming of flow control policies in the network. An OpenFlow switch includes a programmable packet processing pipeline (sometimes referred to as the OpenFlow pipeline). The OpenFlow pipeline includes one or more flow tables, where each flow table includes one or more flow entries. The flow tables of an OpenFlow pipeline are sequentially numbered, starting from zero. Pipeline processing starts at the first flow table (e.g., flow table 0). When processed by a flow table, a packet is matched against the flow entries of the flow table to select a flow entry. If a flow entry is found, the instruction set included in that flow entry is executed. These instructions may explicitly direct the packet to another (higher numbered) flow table (e.g., using the Goto-Table instruction). Typically, a packet can only be directed to a flow table having a table number that is greater than the table number of the current flow table. In other words, pipeline processing can only go forwards and not backwards.

Although the current OpenFlow specification does not support going backwards in the pipeline (e.g., from flow table having a higher number to a flow table having a lower number), various extensions are available that allow pipeline processing to go backwards in the pipeline (e.g., sometimes referred to as "resubmit" extensions). The ability to go backwards in the pipeline can potentially cause data plane loops within the OpenFlow switch. Data plane loops can be hazardous for an SDN network since they can consume a large amount of processing resources.

SUMMARY

A method is implemented by a network device functioning as a switch in a software defined networking (SDN) network to detect data plane loops in the SDN network. The method includes receiving a packet, setting a value of a packet register associated with the packet to an initial loop count value, performing an arithmetic operation on the packet register to update the value of the packet register to an updated loop count value when the packet is to be resubmitted to a current flow table or a previous flow table of a packet processing pipeline of the switch, and determining that the packet is in a data plane loop in response to a determination that the updated loop count value is an invalid value.

A network device is configured to detect data plane loops in a software defined networking (SDN) network, where the network device functions as a switch in the SDN network. The network device includes a set of one or more processors and a non-transitory machine-readable storage medium having stored therein a data plane loop detection component. The data plane loop detection component, when executed by the set of one or more processors, causes the network device to receive a packet, set a value of a packet register associated with the packet to an initial loop count value, perform an arithmetic operation on the packet register to update the value of the packet register to an updated loop count value when the packet is to be resubmitted to a current flow table or a previous flow table of a packet processing pipeline of the switch, and determine that the packet is in a data plane loop in response to a determination that the updated loop count value is an invalid value.

A non-transitory machine-readable medium has computer code stored therein, which when executed by a set of one or more processors of a network device functioning as a switch in a software defined networking (SDN) network, causes the network device to perform operations for detecting data plane loops in the SDN network. The operations include receiving a packet, setting a value of a packet register associated with the packet to an initial loop count value, performing an arithmetic operation on the packet register to update the value of the packet register to an updated loop count value when the packet is to be resubmitted to a current flow table or a previous flow table of a packet processing pipeline of the switch, and determining that the packet is in a data plane loop in response to a determination that the updated loop count value is an invalid value.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs, and within this straight forward approach a traditional distributed approach (commonly used by traditional routers) with a centralized approach for maintaining reachability and forwarding information (also called network control), according to some embodiments of the invention.

FIG. 6E illustrates the simple case of where each of the NDs implements a single NE, but a centralized control plane has abstracted multiple of the NEs in different NDs into (to represent) a single NE in one of the virtual network(s), according to some embodiments of the invention.

FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
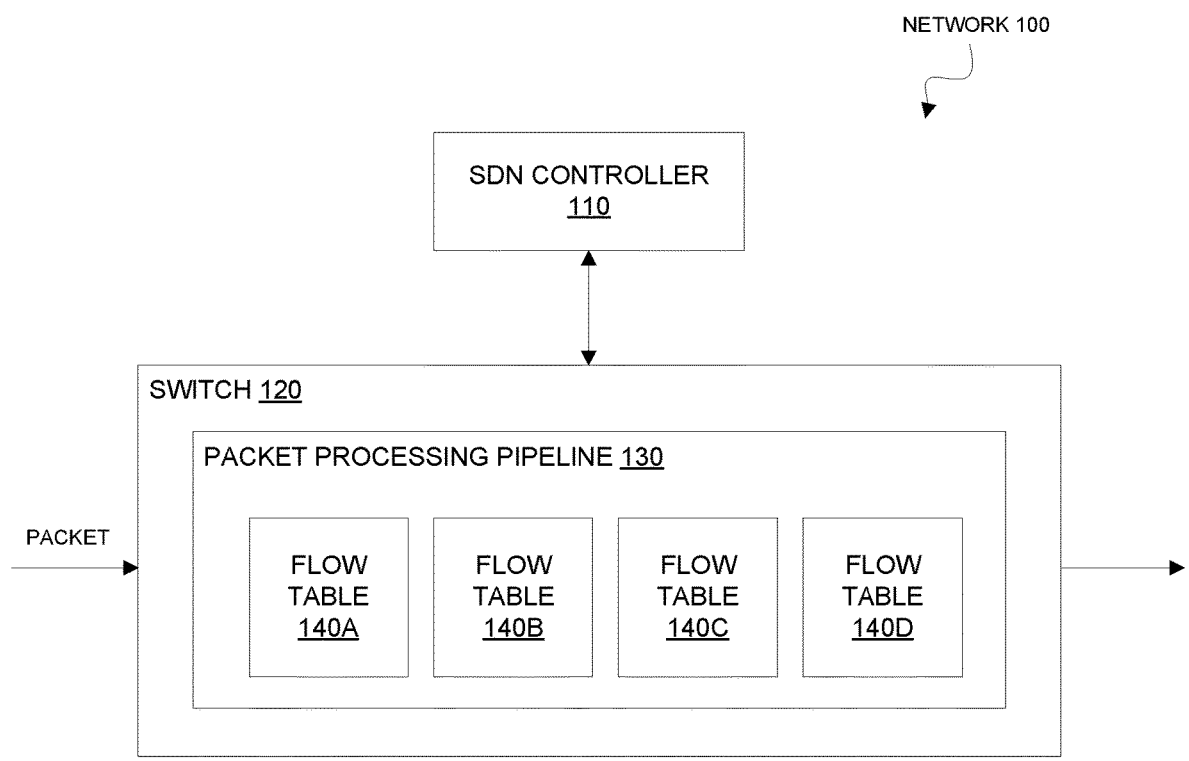
FIG. 1 is a block diagram of a Software Defined Networking (SDN) network in which data plane loop detection can be performed, according to some embodiments.

The following description describes methods and apparatus for detecting data plane loops in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A data plane loop can be defined in many ways. A very simple definition of a data plane loop can refer to a scenario where the same packet traverses flow table A, flow table B, and then back to flow table A N number of times. Another definition of a data plane loop can refer to a scenario where the same packet arrives at the same flow table N times (even if the packet traverses different flow tables each time). Another definition of a data plane loop can refer to a scenario where the same packet traverses the same flow tables and/or groups within the same switch N times, where the packet may have been punted to the SDN controller in between as well. Even though it is not just the data plane that is involved in this scenario, it can still be considered a data plane loop.

However, any technique for detecting data plane loops that keeps track of the flow tables that packets traverse within a switch is not scalable. For example, a technique that records the list of flow tables traversed by a packet in the packet itself can create a large amount of packet forwarding overhead due to requiring an additional action in every flow table to append the flow table's identifier to the list.

Static loop detection techniques may be used to detect data plane loops. Static loop detection techniques employ a pre-programming model where the SDN controller only programs a flow entry in a flow table if it is determined that the flow entry will not cause a data plane loop. However, static loop detection techniques are also not scalable. Necessitating data plane loop detection before programming every flow entry can slow down flow entry programming. This is undesirable in applications that require very high transaction rates (e.g., some service chaining solutions have a Key Performance Indicator (KPI) requirement of programming several thousands of flow entries per second across different switches).

Embodiments described herein overcome some of the disadvantages of the conventional techniques by providing a scalable technique for detecting data plane loops in an SDN network. Embodiments utilize a packet register to keep track of the number of times that a loop-causing event for a packet has occurred. When a threshold number of loop-causing events occur for a packet, the packet is deemed to be in a data plane loop. A loop-causing event for a packet may include events that are prone to cause data plane loops such as resubmitting the packet to the current flow table or a previous flow table of the packet processing pipeline (e.g., going backwards in the packet processing pipeline) and/or outputting the packet to the SDN controller.

According to some embodiments, when the switch receives a packet, the switch sets the value of the packet register associated with the packet to an initial loop count value. Whenever a loop-causing event for the packet is to occur, the switch performs an arithmetic operation (e.g., decrement operation) on the packet register to update the value of the packet register to an updated loop count value. If the updated loop count value is an invalid value (e.g., zero), then the switch determines that the packet is in a data plane loop. In response, the switch may transmit a control message to the SDN controller to indicate to the SDN controller that the packet is in a data plane loop. Other embodiments are further described herein below.

FIG. 1 is a block diagram of a Software Defined Networking (SDN) network in which data plane loop detection can be performed, according to some embodiments. The SDN network 100 includes an SDN controller 110 that is communicatively coupled to a switch 120. In one embodiment, the SDN controller 110 and the switch 120 communicate using a southbound communications protocol such as OpenFlow (e.g., OpenFlow 1.5) or a variant thereof. For clarity and ease of understanding, embodiments will be primarily described in a context where OpenFlow is used as the southbound communication protocol between the SDN controller 110 and the switch 120. However, it should be understood that the SDN controller 110 and the switch 120 can communicate using other types of southbound communication protocols and that the data plane loop detection techniques disclosed herein can be implemented in a context where the SDN controller 110 and the switch 120 use other types of southbound communications protocols without departing from the spirit and scope of the present disclosure. For sake of illustration the SDN network 100 is shown as including a single SDN controller 110 that manages a single switch 120. However, it should be understood that the SDN network 100 can include more than one SDN controller 110 and that each SDN controller 110 can manage more than one switch 120.

The switch 120 includes a packet processing pipeline 130 that includes multiple flow tables 140. In the example shown in the diagram, the packet processing pipeline 130 includes four flow tables 140 (flow tables 140A-D). Each flow table 140 may include a set of flow entries, where each flow entry includes a packet matching criteria (e.g., carried in a match field) and a corresponding set of instructions to execute when a packet matches the packet matching criteria. A packet is said to match a flow entry if the packet matches the packet matching criteria of the flow entry. In one embodiment, when the switch 120 receives a packet in the data plane, the switch 120 initially matches the packet against flow entries in the foremost flow table 140 of the packet processing pipeline 130 (e.g., flow table 140A). The switch 120 may then continue to match the packet against flow entries in subsequent flow tables 140. If the packet matches a flow entry, then the switch 120 executes the corresponding set of instructions of that flow entry.

Figure 2:
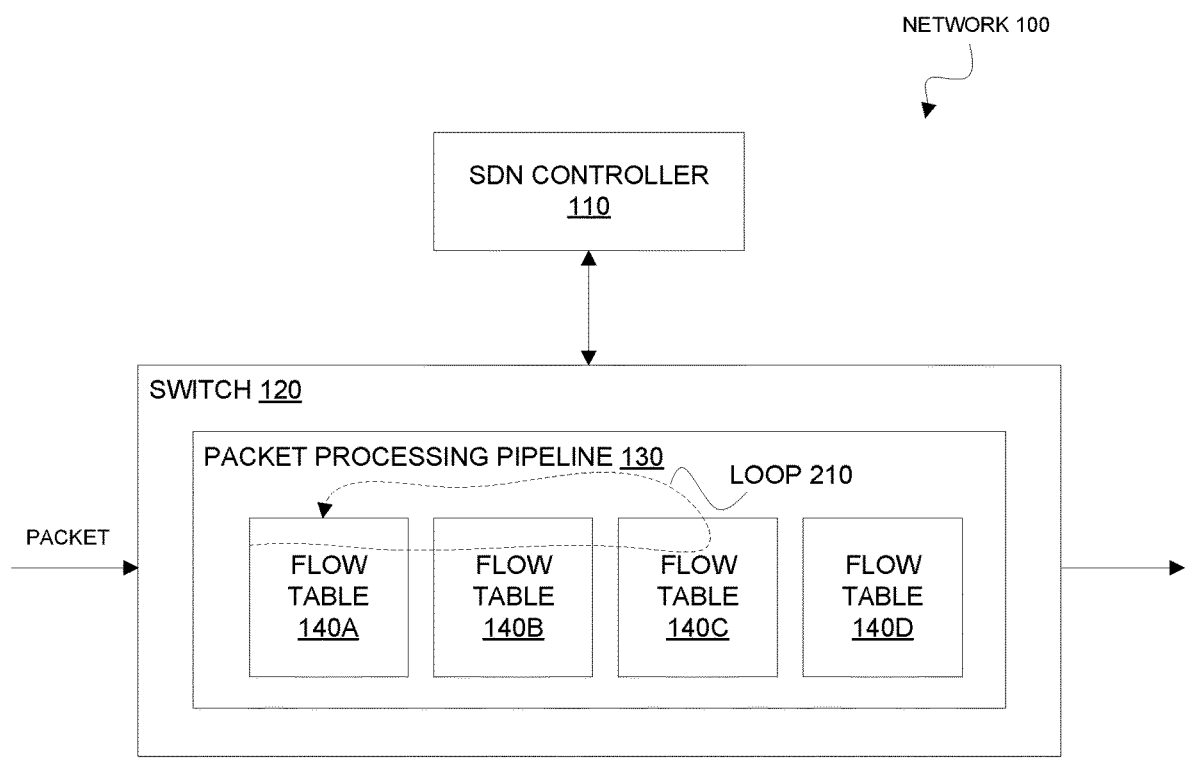
FIG. 2 is a diagram illustrating a data plane loop, according to some embodiments.

The set of instructions specified in a flow entry may include an instruction to resubmit the packet to the current flow table 140 or a previous flow table 140 (e.g., a flow table 140 that comes before the current flow table 140 in the packet processing pipeline 130). As used herein, "resubmit" or "resubmitting" refers to directing a packet backwards in the packet processing pipeline 130 (e.g., back to the current flow table 140 processing the packet or a previous flow table 140 (e.g., a flow table 140 that has a lower number than the current flow table 140)). This is in contrast to how packets are typically processed in OpenFlow, which can only direct packets forward in the packet processing pipeline 130 (e.g., using the Goto-Table instruction to direct a packet to a flow table 140 that has a higher table number than the current flow table 140). Resubmitting the packet thus causes the packet to go backwards in the packet processing pipeline 130. Although the current OpenFlow specification does not support going backwards in the packet processing pipeline 130, various extensions are available that allow pipeline processing to go backwards in the packet processing pipeline 130 (sometimes referred to as "resubmit" extensions). The ability to go backwards in the packet processing pipeline 130 can potentially cause data plane loops within the switch 120. For example, as illustrated in FIG. 2, a resubmit action executed at flow table 140C may cause the same packet to be directed back to flow table 140A multiple times, which results in the packet being stuck in a loop 210.

The set of instructions specified in a flow entry may include an instruction to transfer control of the packet to the SDN controller 110 (colloquially referred to as "punting" the packet to the SDN controller 110). Transferring control of a packet to an SDN controller 110 may also be referred to herein as outputting the packet to the SDN controller 110. In OpenFlow, the switch 120 may transfer control of the packet to the SDN controller 110 by transmitting an OpenFlow Packet-In message to the SDN controller 110. In one embodiment, the OpenFlow Packet-In message includes the packet itself (or a relevant portion thereof (e.g., the header)), the table identifier (ID) of the flow table 140 that triggered the OpenFlow Packet-In message, and an indication of the reason that control of the packet is being transferred to the SDN controller 110.

Figure 3:
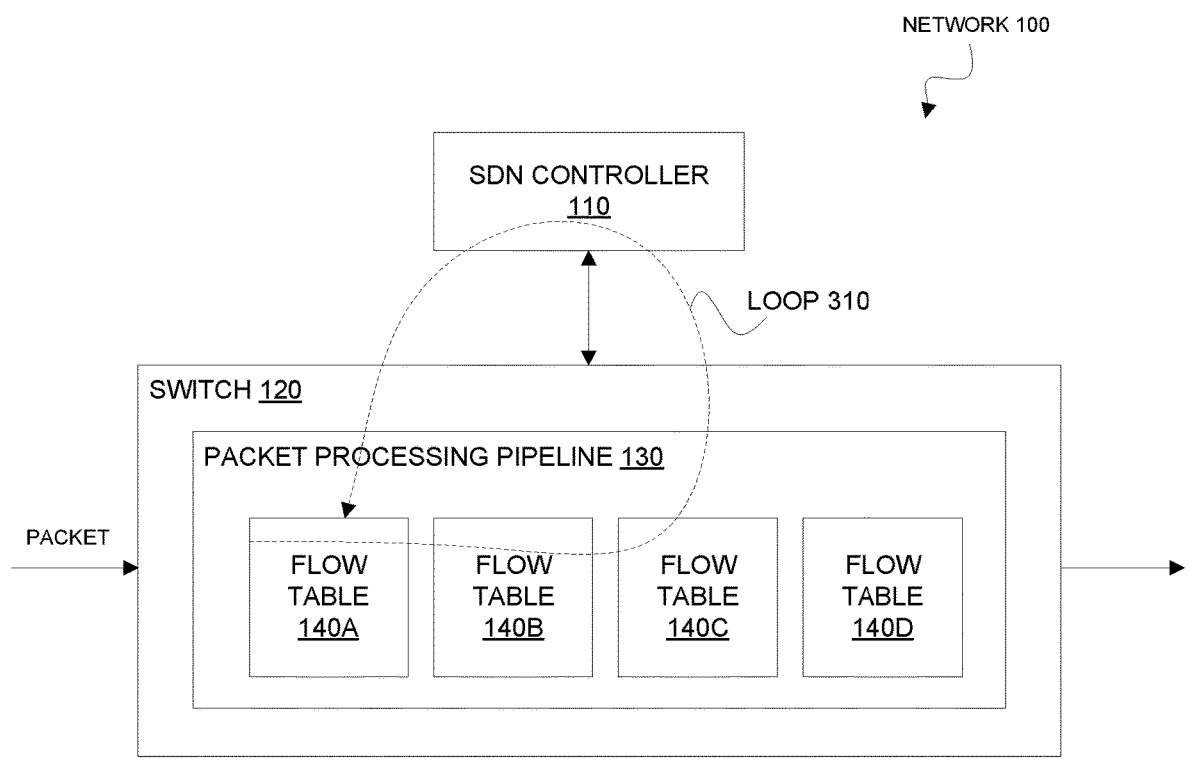
FIG. 3 is a diagram illustrating another data plane loop, according to some embodiments.

The SDN controller 110 may respond to the OpenFlow Packet-In message by transmitting a corresponding OpenFlow Packet-Out message to the switch 120. The OpenFlow Packet-Out message typically includes a list of actions specifying how the switch 120 should process the packet. In one embodiment, the list of actions may include an action to output the packet to the OFPP_TABLE reserved port, which instructs the switch 120 to process the packet through the packet processing pipeline 130, starting at the foremost flow table 140 of the packet processing pipeline 130 (e.g., flow table 140A). Incorrect usage of the OpenFlow Packet-In message and the OpenFlow Packet-Out message can create data plane loops in the SDN network. For example, as illustrated in FIG. 3, an output to controller action executed at flow table 140C may cause the same packet to be output to the SDN controller 110 and subsequently directed back to flow table 140A, which results in the packet being stuck in a loop 310. Even though it is not just the data plane that is involved in this scenario (control plane is also involved), it can still be considered a data plane loop.

As illustrated with reference to FIG. 2 an FIG. 3, resubmitting a packet to the current flow table 140 or a previous flow table 140 in the packet processing pipeline 130 and outputting a packet to an SDN controller 110 are events that are prone to cause data plane loops. In one embodiment, as will be described in further detail herein below, a switch 120 may determine that a given packet is in a data plane loop if a loop-causing event occurs for the packet more than a threshold number of times.

An embodiment of a technique for detecting data plane loops will now be described. When the switch 120 receives a packet (in the data plane), the switch 120 sets the value of a packet register associated with the packet to an initial loop count value. The initial loop count value may correspond to the maximum number of loop-causing events that can occur before the packet is deemed to be in a data plane loop. In this case, a higher initial loop count value may generally result in less false positives. Loop-causing events include events that are prone to cause data plane loops such as resubmitting the packet (to the current flow table 140 or a pervious flow table 140) and/or outputting the packet to the SDN controller 110.

As used herein, a packet register is a construct that is used to store temporary information alongside a packet through pipeline processing (e.g., scratch space). For example, OpenFlow provides packet register fields OXM_OF_PKT_REG(N) for this purpose. In OpenFlow, each packet register is 64 bit wide and maskable. In most cases, the packet registers cannot be matched in flow tables 140. In OpenFlow, the value of a packet register can be set using the set-field or copy-field actions.

The switch 120 may be configured such that whenever a loop-causing event is to occur for the packet (e.g., resubmitting the packet or outputting the packet to the SDN controller 110), the switch 120 decrements the value of the packet register associated with the packet. In conjunction with decrementing the value of the packet register, the switch 120 may check whether the value of the packet register has reached zero or an otherwise invalid value. If the value of the packet register reaches zero or other invalid value, this indicates that a sufficient number of loop-causing events have occurred for the packet to be deemed to be in a data plane loop. In response, the switch 120 may transmit a control message to the SDN controller 110 to indicate that the packet is in a data plane loop. For example, in an OpenFlow context, the control message may be an OpenFlow Packet-In message and the reason field of the OpenFlow Packet-In message may be set to indicate that the packet register associated with the packet has an invalid value (indicating that the packet is in a data plane loop). In response to receiving the control message (indicating that a packet is in a data plane loop), the SDN controller 110 may take appropriate corrective action. In one embodiment, the set of Packet-In reasons in OpenFlow can be extended with a reason for indicating that the packet is being output to the controller because the packet register has an invalid value after a decrement operation (OFPR_INVALID_DEC_REGISTER) as follows:

```
/* Why is this packet being sent to the controller? */
enum ofp_packet_in_reason {
    OFPR_TABLE_MISS = 0, /* No matching flow (table-miss flow entry). */
    OFPR_APPLY_ACTION = 1, /* Output to controller in apply-actions. */
    OFPR_INVALID_TTL = 2, /* Packet has invalid TTL */
    OFPR_ACTION_SET = 3, /* Output to controller in action set. */
    OFPR_GROUP = 4, /* Output to controller in group bucket. */
    OFPR_PACKET_OUT = 5, /* Output to controller in packet-out. */
    /************************/
    OFPR_INVALID_DEC_REGISTER = 6 /* Packet has invalid packet register value after decrement */
    /************************/
};
```

Currently, OpenFlow does not provide a mechanism to perform a decrement operation (or any arithmetic operation) on a packet register. In one embodiment, a new action can be added to OpenFlow to perform a decrement operation on a packet register. When the switch 120 performs a decrement operation on a packet register, the switch 120 may also verify whether the resulting value is zero or otherwise invalid (which indicates that the packet is in a data plane loop).

In one embodiment, the set of actions in OpenFlow can be extended with an action for setting the value of a packet register (OFPAT_SET_REGISTER) and an action for performing a decrement operation on a packet register (OFPAT_DEC_REGISTER) as follows:

```
enum ofp_action_type {
    OFPAT_OUTPUT = 0, /* Output to switch port. */
    OFPAT_COPY_TTL_OUT = 11, /* Copy TTL "outwards" -- from next-to-outermost to outermost */
    OFPAT_COPY_TTL_IN = 12, /* Copy TTL "inwards" -- from outermost to next-to-outermost */
    OFPAT_SET_MPLS_TTL = 15, /* MPLS TTL */
    OFPAT_DEC_MPLS_TTL = 16, /* Decrement MPLS TTL */
```

```
OFPAT_PUSH_VLAN = 17, /* Push a new VLAN tag */
OFPAT_POP_VLAN = 18, /* Pop the outer VLAN tag */
OFPAT_PUSH_MPLS = 19, /* Push a new MPLS tag */
OFPAT_POP_MPLS = 20, /* Pop the outer MPLS tag */
OFPAT_SET_QUEUE = 21, /* Set queue id when outputting to a port */
OFPAT_GROUP = 22, /* Apply group. */
OFPAT_SET_NW_TTL = 23, /* IP TTL. */
OFPAT_DEC_NW_TTL = 24, /* Decrement IP TTL. */
OFPAT_SET_FIELD = 25, /* Set a header field using OXM TLV
format. */
OFPAT_PUSH_PBB = 26, /* Push a new PBB service tag (I-TAG) */
OFPAT_POP_PBB = 27, /* Pop the outer PBB service tag (I-TAG) */
OFPAT_COPY_FIELD = 28, /* Copy value between header and
register. */
OFPAT_METER = 29, /* Apply meter (rate limiter) */
/************************/
OFPAT_SET_REGISTER = 30, /* Set value of packet register */
OFPAT_DEC_REGISTER = 31, /* Decrement value of packet
register */
/************************/
OFPAT_EXPERIMENTER = 0xffff
};
```

If the value of the packet register associated with the packet is larger than zero or otherwise valid following a decrement operation, then the switch 120 may continue with processing the packet. For example, the switch 120 may resubmit the packet or output the packet to the SDN controller 110. Special consideration may be needed when outputting the packet to the SDN controller 110. When a packet is output to the SDN controller 110 (or otherwise leaves the packet processing pipeline 130), the value of the packet register associated with that packet may be reset or otherwise lost. As such, in the event that the packet is to be output to the SDN controller 110, the value of the packet register may need to be preserved so that loop counting can resume from the same point when the packet is injected back into the data plane (e.g., back to the packet processing pipeline 130). In one embodiment, the switch 120 outputs the packet to the SDN controller 110 by transmitting a first control message to the SDN controller and this first control message includes the current value of the packet register associated with the packet (which corresponds to the current loop count value for the packet). Upon receiving the first control message, the SDN controller 110 may transmit a second control message to the switch 120 that is responsive to the first control message. The second control message may include an instruction for the switch 120 to set the value of the packet register associated with the packet to the current loop count value for the packet (e.g., the same value that was included in the first control message). Upon receiving the second control message, the switch 120 may set the value of the packet register associated with the packet to the current loop count value for the packet according to the instruction included in the second control message. This allows the value of the packet register to be set to the same value as before the packet was output to the SDN controller 110 so that the switch 120 may resume loop counting from where it left off.

In one embodiment, the first control message is an OpenFlow Packet-In message and the second control message is an OpenFlow Packet-Out message. In one embodiment, the current loop count value for the packet is carried in a metadata field of the OpenFlow Packet-In message. In one embodiment, the switch 120 adds a virtual local area network (VLAN) tag to the packet before outputting the packet to the SDN controller 110, where the VLAN tag carries the current loop count value for the packet. Since the packet is carried inside the Transmission Control Protocol (TCP) or Stream Control Transmission Protocol (SCTP) connection (between the switch 120 and the SDN controller 110) as payload, the VLAN tag that is added to the packet is not processed by any switches 120 and thus does not disrupt data plane packet processing. Also, the switch 120 need not perform any packet fragmentation due to the increased size caused by the additional VLAN tag since the packet is carried inside the TCP or SCTP connection as payload. Also, the performance degradation due to adding the VLAN tag is negligible.

In one embodiment, the switch 120 generates flow entries that cause the switch 120 to perform data plane loop detection. Some or all of these flow entries may be generated in response to the switch 120 receiving instructions from the SDN controller 110. In one embodiment, the switch 120 generates a flow entry that includes an instruction to set the value of the packet register associated with a packet to an initial loop count value. In one embodiment, the switch 120 generates the first flow entry in a foremost flow table 140 (e.g., flow table 140A) of the packet processing pipeline 130 of the switch 120. This allows the value of the packet register to be set to the initial loop count value when the packet first enters the packet processing pipeline 130. In one embodiment, the switch 120 generates a flow entry that includes an instruction for the switch 120 to perform a decrement operation on the packet register followed by an instruction to resubmit packets matching the flow entry. This causes the value of the packet register to be decremented when the packet is to be resubmitted. In one embodiment, the switch 120 generates a flow entry that includes an instruction to perform a decrement operation on the packet register followed by an instruction to output packets matching the flow entry to the SDN controller 110. This causes the value of the packet register to be decremented when the packet is to be output to the SDN controller 110.

Table I illustrates flow entries in a packet processing pipeline 130 that can cause data plane loops.

TABLE I

| | |
|---|---|
| Flow Table 0 | Match on destination IP address A.B.C.D:<br>SET_REGISTER: 10<br>GOTO TABLE 10 |
| Flow Table 10 | Match on Port A:<br>GROUP 20 |
| Group 20 | If Port A busy:<br>DEC_REGISTER<br>RESUBMIT TABLE 10 |

As shown in Table I, Flow Table 0 includes a flow entry that matches on destination IP address A.B.C.D. The flow entry includes an instruction to set the value of the packet register to 10 (SET_REGISTER: 10) followed by an instruction to direct matching packets to flow table 10 (GOTO TABLE 10). Flow Table 10 includes a flow entry that matches on port A. The flow entry includes an instruction to direct matching packets to Group 20 (GROUP 20). Group 20 includes an instruction to perform a decrement operation on the packet register (DEC_REGISTER) followed by an instruction to resubmit packets to Flow Table 10 if port A is busy. This configuration of the packet processing pipeline 130 may cause a packet to loop within the switch 120 from Flow Table 10 to Group 20, and back to Flow Table 10 multiple times. The placement of the DEC_REGISTER instruction before the resubmit instruction ensures that the value of the packet register is decremented each time the packet is to be resubmitted. When the value of the packet register reaches zero (which indicates that the value of the packet register has been decremented 10 times), the switch 120 may determine that the packet is in a data plane loop and transmit a control message to the SDN controller 110 indicating as such.

Figure 4:
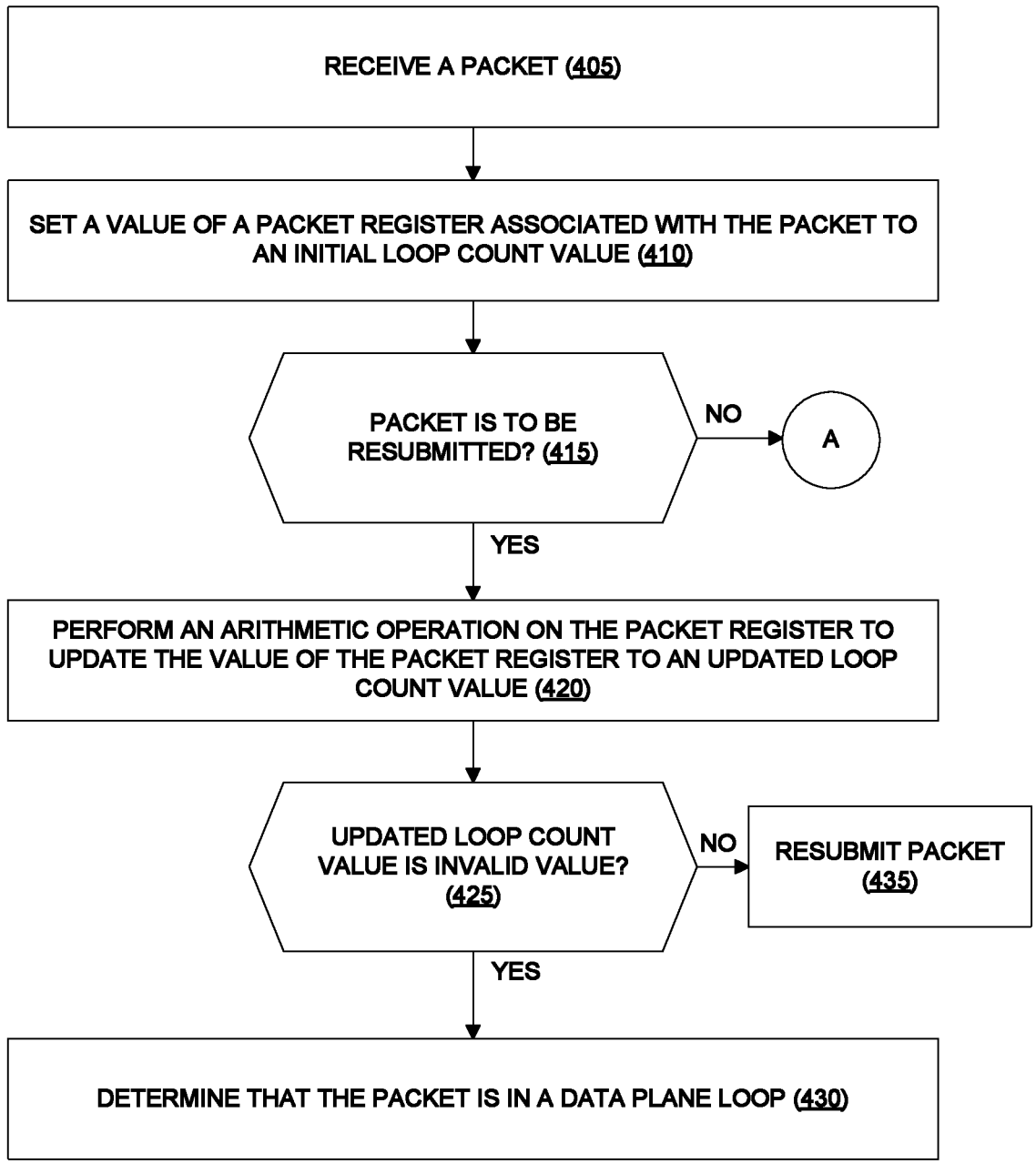
FIG. 4 is a flow diagram of a process to detect data plane loops in an SDN network, according to some embodiments.

FIG. 4 is a flow diagram of a process to detect data plane loops in an SDN network, according to some embodiments. In one embodiment, the operations of the flow diagram may be performed by a network device functioning as a switch 120 in an SDN network 100. In one embodiment, the switch 120 may communicate with an SDN controller 110 in the SDN network 100 using OpenFlow or a similar southbound communications protocol. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In one embodiment, the process is initiated when the switch 120 receives a packet (e.g., in the data plane) (block 405). The switch 120 sets a value of a packet register associated with the packet to an initial loop count value (block 410). If the packet is to be resubmitted (decision block 415), the switch 120 performs an arithmetic operation on the packet register to update the value of the packet register to an updated loop count value (block 420). In one embodiment, the arithmetic operation is a decrement operation (e.g., decrement the value of the packet register by 1). If the updated loop count value is an invalid value (e.g., zero) (decision block 425), then the switch 120 determines that the packet is in a data plane loop (block 430). In this case, in one embodiment, the switch 120 transmits a control message to the SDN controller 110, where the control message includes an indication that the packet is in a data plane loop. In one embodiment, the control message is an OpenFlow Packet-In message. In one embodiment, the indication that the packet is in a data plane loop is carried in a reason field of the OpenFlow Packet-In message. Returning to decision block 425, if the updated loop count value is not an invalid value (it is still valid), then the switch 120 proceeds with resubmitting the packet (block 435).

Returning to decision block 415, if the packet is not to be resubmitted, but the packet is to be output to the SDN controller 110 (decision block 440), then the switch 120 performs an arithmetic operation on the packet register associated with the packet to update the value of the packet register to an updated loop count value (block 445). If the updated loop count value is an invalid value (decision block 455), then the switch 120 determines that the packet is in a data plane loop (block 460). In this case, in one embodiment, the switch 120 transmits a control message to the SDN controller 110, where the control message includes an indication that the packet is in a data plane loop. In one embodiment, the control message is an OpenFlow Packet-In message. In one embodiment, the indication that the packet is in a data plane loop is carried in a reason field of the OpenFlow Packet-In message. Returning to decision block 455, if the updated loop count value is not an invalid value (it is still valid), then the switch 120 proceeds with transmitting a first control message to the SDN controller 110 to output the packet to the SDN controller 110, where the first control message includes the updated loop count value (e.g., the current value of the packet register) (block 465). In one embodiment, the first control message is an OpenFlow Packet-In message. In one embodiment, the updated loop count value (which corresponds to the current loop count value for the packet) is carried in a metadata field of the OpenFlow Packet-In message. In one embodiment, the first control message is an OpenFlow Packet-In message and the OpenFlow Packet-In message includes the packet (or a relevant portion thereof), and the updated loop count value is carried in a VLAN tag added to the packet.

The switch 120 may then receive a second control message from the SDN controller 110 that is responsive to the first control message transmitted to the SDN controller 110, where the second control message includes an instruction for the switch 120 to set the value of the packet register associated with the packet to the updated loop count value (the same value that was included in the first control message) (block 470). The switch 120 may then set the value of the packet register to the updated loop count value according to the instruction included in the second control message (block 475). In one embodiment, the second control message is an OpenFlow Packet-Out message.

Returning to decision block 440, if the packet is not to be resubmitted and the packet is not to be output to the SDN controller 110, then the switch 120 continues normal packet processing (block 450) (since no loop-causing events are about to occur for the packet).

In one embodiment, the switch 120 generates flow entries that cause the switch 120 to perform data plane loop detection (e.g., according to the operations of blocks 405-430). Some or all of these flow entries may be generated in response to the switch 120 receiving instructions from the SDN controller 110. In one embodiment, the switch 120 generates a flow entry that includes an instruction to set the value of a packet register associated with a packet to the initial loop count value. In one embodiment, the switch 120 generates this flow entry in a foremost flow table 140 of the packet processing pipeline 130 of the switch 120. This allows the value of the packet register to be set to the initial loop count value when the packet first enters the packet processing pipeline 130. In one embodiment, the switch 120 generates a flow entry that includes an instruction for the switch 120 to perform a decrement operation on the packet register followed by an instruction to resubmit packets matching the flow entry (e.g., direct packet back to the current flow table 140 or a previous flow table 140). This causes the value of the packet register to be decremented when the packet is to be resubmitted. In one embodiment, the switch 120 generates a flow entry that includes an instruction perform a decrement operation on the packet register followed by an instruction to output packets matching the flow entry to the SDN controller 110. This causes the value of the packet register to be decremented when the packet is to be output to the SDN controller 110. In one embodiment, the switch 120 may generate group entries that cause the switch 120 to perform data plane loop detection. The group entries may include similar instructions as described above with respect to the flow entries to perform data plane loop detection.

Figure 5:
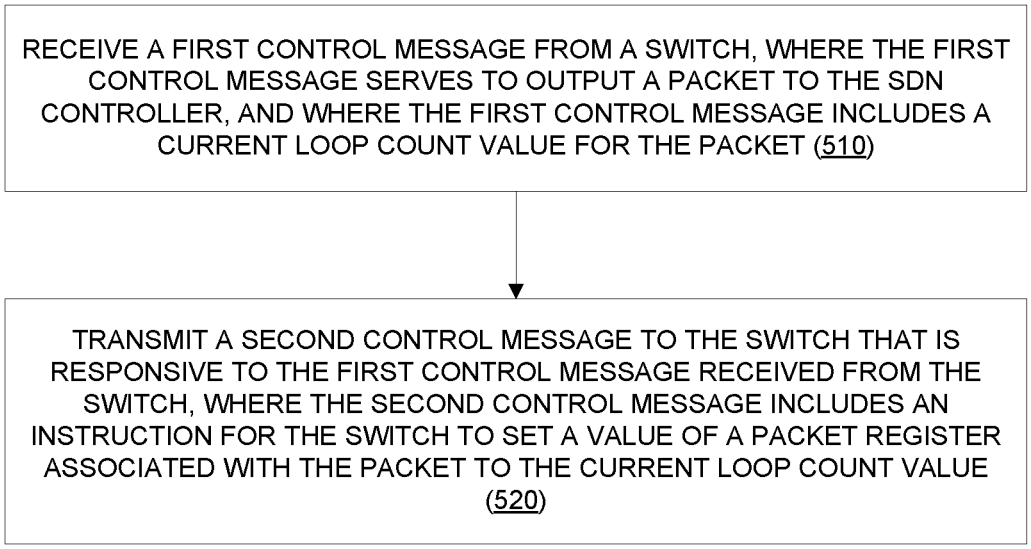
FIG. 5 is a flow diagram of a process to support the detection of data plane loops in an SDN network, according to some embodiments.

FIG. 5 is a flow diagram of a process to support the detection of data plane loops in an SDN network, according to some embodiments. In one embodiment, the operations of the flow diagram may be performed by a network device functioning as an SDN controller 110 in an SDN network 100. In one embodiment, the SDN controller 110 may communicate with a switch 120 in the SDN network 100 using OpenFlow or a similar southbound communications protocol.

In one embodiment, the process is initiated when the SDN controller 110 receives a first control message from a switch 120, where the first control message serves to output a packet to the SDN controller 110, and where the first control message includes a current loop count value for the packet (block 510). The switch 120 may have transmitted the first control message to the SDN controller 110 to output the packet to the SDN controller 110 as part of the operation of block 465. The SDN controller 110 then transmits a second control message to the switch 120 that is responsive to the first control message received from the switch 120, where the second control message includes an instruction for the switch 120 to set a value of a packet register associated with the packet to the current loop count value (block 520). In this way, the SDN controller 110 programs the switch 120 with the current loop count value so that the switch 120 can resume loop counting from where it left off (when the switch 120 previously output the packet to the SDN controller 110).

While the data plane loop detection techniques disclosed herein consider resubmitting a packet and/or outputting a packet to the SDN controller 110 as being loop-causing events, it should be understood that embodiments are not so limited. Some embodiments may consider other actions/events to be loop-causing events. Also, it should be understood that in some embodiments, the arithmetic operation on the packet register is an increment operation (e.g., initial loop count value is zero and increment until reaching a threshold value that corresponds to the maximum number of loop-causing events that can occur before the packet is deemed to be in a data plane loop).

Figure 6A:
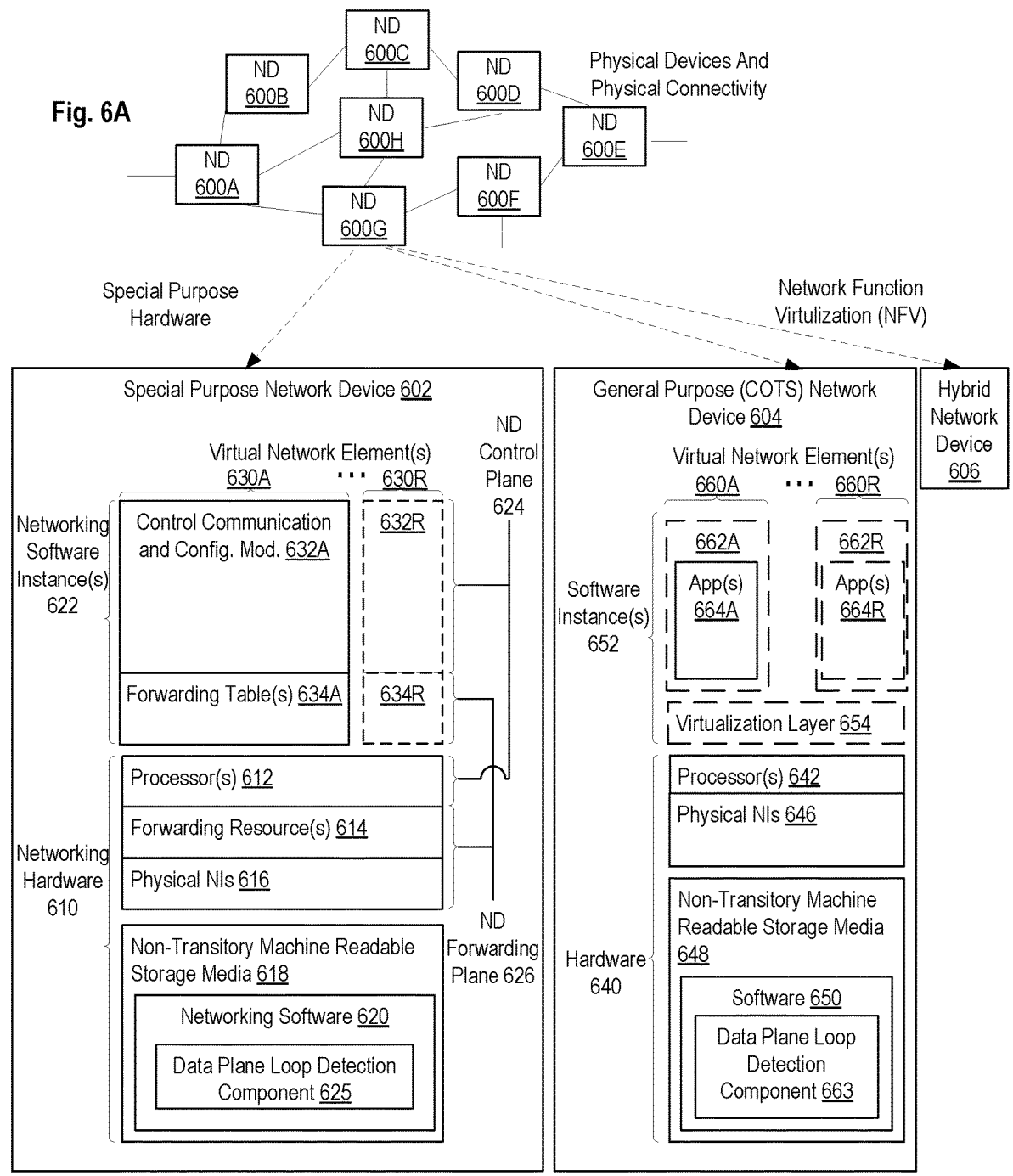
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

Software 620 can include code such as data plane loop detection component 625, which when executed by networking hardware 610, causes the special-purpose network device 602 to perform operations of one or more embodiments of the present invention as part networking software instances 622.

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
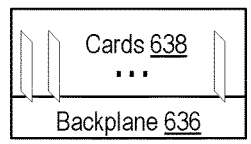
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as back-plane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

Software 650 can include code such as data plane loop detection component 663, which when executed by processor(s) 642, cause the general purpose network device 604 to perform operations of one or more embodiments of the present invention as part software instances 662A-R.

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

In one embodiment, the network controller 678 may include a data plane loop detection component 681 that when executed by the network controller 678, causes the network controller 678 to perform operations of one or more embodiments described herein above.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
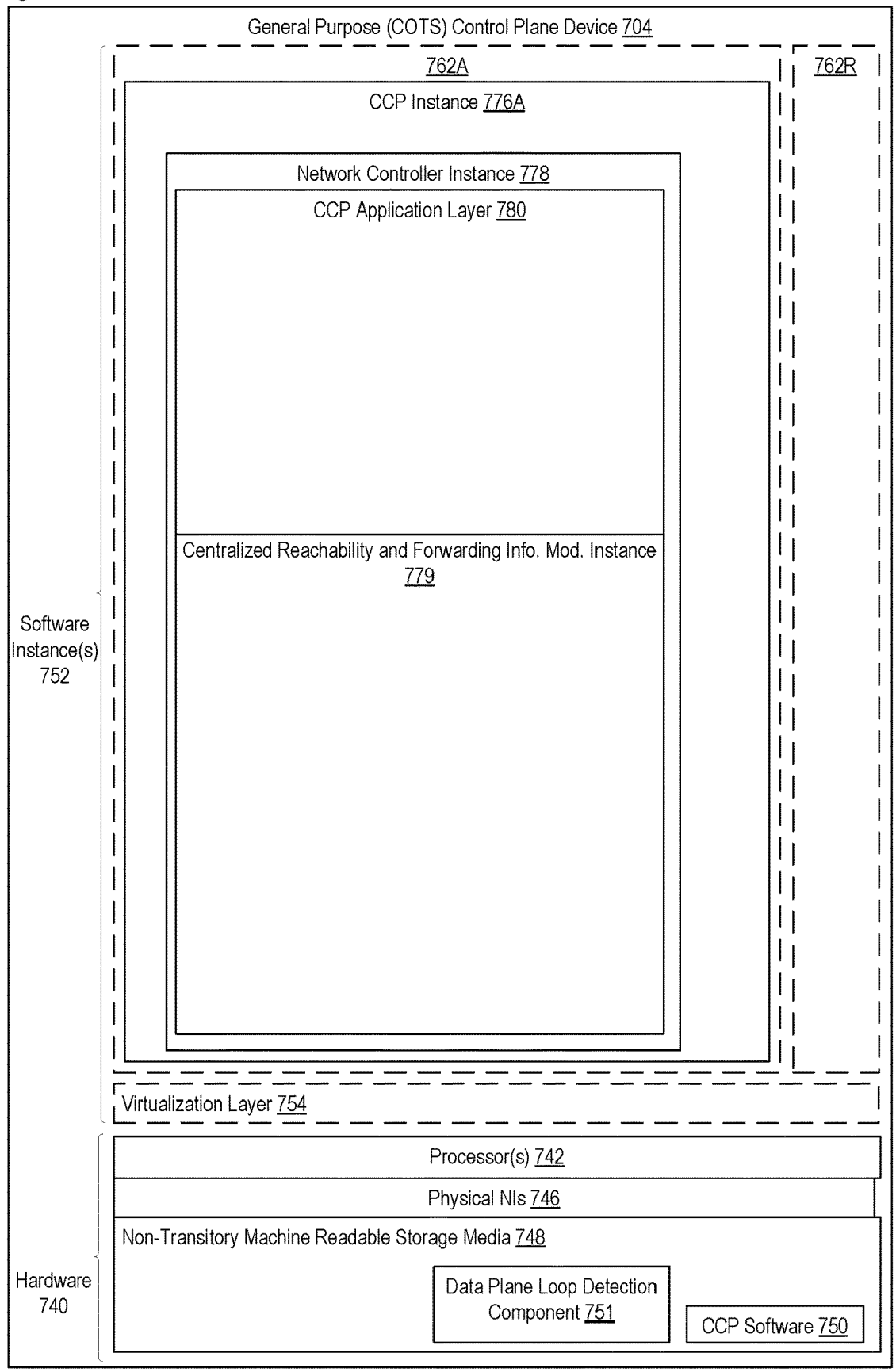
FIG. 7 illustrates a general purpose control plane device with centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750 and a data plane loop detection component 751.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The data plane loop detection component 751 can be executed by hardware 740 to perform operations of one or more embodiments of the present invention as part of software instances 752.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device functioning as a switch in a software defined networking (SDN) network to detect data plane loops in the SDN network, the method comprising:
   receiving a packet;
   setting a value of a packet register associated with the packet to an initial loop count value;
   performing an arithmetic operation on the packet register to update the value of the packet register to an updated loop count value when the packet is to be resubmitted to a current flow table or a previous flow table of a packet processing pipeline of the switch;
   determining that the packet is in a data plane loop in response to a determination that the updated loop count value is an invalid value; and
   transmitting a control message to an SDN controller in response to a determination that the packet is in the data plane loop, wherein the control message is an OpenFlow Packet-In message and includes an indication that the packet is in the data plane loop, wherein the indication is carried in a reason field of the OpenFlow Packet-In message.

2. The method of claim 1, wherein the arithmetic operation is a decrement operation.

3. The method of claim 1, further comprising:
   generating a first flow entry that includes an instruction to set the value of the packet register to the initial loop count value; and
   generating a second flow entry that includes an instruction to perform the arithmetic operation on the packet register and an instruction to resubmit packets matching the second flow entry to a current flow table or a previous flow table of the packet processing pipeline of the switch.

4. The method of claim 3, wherein the first flow entry is generated in a foremost flow table of the packet processing pipeline of the switch.

5. The method of claim 1, further comprising:
   performing the arithmetic operation on the packet register to update the value of the packet register when the packet is to be output to an SDN controller.

6. The method of claim 5, further comprising:
   transmitting a first control message to the SDN controller to output the packet to the SDN controller, wherein the first control message includes the value of the packet register, wherein the value of the packet register corresponds to a current loop count value for the packet;
   receiving a second control message from the SDN controller that is responsive to the first control message transmitted to the SDN controller, wherein the second control message includes an instruction for the switch to set the value of the packet register to the current loop count value; and setting the value of the packet register to the current loop count value according to the instruction included in the second control message.

7. The method of claim 6, wherein the first control message is an OpenFlow Packet-In message.

8. The method of claim 7, wherein the current loop count value is carried in a metadata field of the OpenFlow Packet-In message.

9. The method of claim 7, wherein the OpenFlow Packet-In message includes the packet, and wherein the current loop count value is carried in a virtual local area network (VLAN) tag added to the packet.

10. The method of claim 6, wherein the second control message is an OpenFlow Packet-Out message.

11. A network device configured to detect data plane loops in a software defined networking (SDN) network, the network device to function as a switch in the SDN network, the network device comprising:
a set of one or more processors; and
a non-transitory machine-readable storage medium having stored therein a data plane loop detection component, which when executed by the set of one or more processors, causes the network device to receive a packet, set a value of a packet register associated with the packet to an initial loop count value, perform an arithmetic operation on the packet register to update the value of the packet register to an updated loop count value when the packet is to be resubmitted to a current flow table or a previous flow table of a packet processing pipeline of the switch, determine that the packet is in a data plane loop in response to a determination that the updated loop count value is an invalid value, and transmit a control message to an SDN controller in response to a determination that the packet is in the data plane loop, wherein the control message is an OpenFlow Packet-In message and includes an indication that the packet is in the data plane loop, wherein the indication is carried in a reason field of the OpenFlow Packet-In message.

12. The network device of claim 11, wherein the arithmetic operation is a decrement operation.

13. A non-transitory machine-readable medium having computer code stored therein, which when executed by a set of one or more processors of a network device functioning as a switch in a software defined networking (SDN) network, causes the network device to perform operations for detecting data plane loops in the SDN network, the operations comprising:
receiving a packet;
setting a value of a packet register associated with the packet to an initial loop count value;
performing an arithmetic operation on the packet register to update the value of the packet register to an updated loop count value when the packet is to be resubmitted to a current flow table or a previous flow table of a packet processing pipeline of the switch;
determining that the packet is in a data plane loop in response to a determination that the updated loop count value is an invalid value; and
transmitting a control message to an SDN controller in response to a determination that the packet is in the data plane loop, wherein the control message is an OpenFlow Packet-In message and includes an indication that the packet is in the data plane loop, wherein the indication is carried in a reason field of the OpenFlow Packet-In message.

14. The non-transitory machine-readable medium of claim 13, wherein the computer code, when executed by the set of one or more processors of the network device, causes the network device to perform further operations comprising:
performing the arithmetic operation on the packet register to update the value of the packet register when the packet is to be output to an SDN controller.

15. The non-transitory machine-readable medium of claim 14, wherein the computer code, when executed by the set of one or more processors of the network device, causes the network device to perform further operations comprising:
transmitting a first control message to the SDN controller to output the packet to the SDN controller, wherein the first control message includes the value of the packet register, wherein the value of the packet register corresponds to a current loop count value for the packet;
receiving a second control message from the SDN controller that is responsive to the first control message transmitted to the SDN controller, wherein the second control message includes an instruction for the switch to set the value of the packet register to the current loop count value; and
setting the value of the packet register to the current loop count value according to the instruction included in the second control message.

16. The non-transitory machine-readable medium of claim 15, wherein the first control message is an OpenFlow Packet-In message, and wherein the second control message is an OpenFlow Packet-Out message.

17. The non-transitory machine-readable medium of claim 16, wherein the current loop count value is carried in a metadata field of the OpenFlow Packet-In message.

18. The non-transitory machine-readable medium of claim 16, wherein the OpenFlow Packet-In message includes the packet, and wherein the current loop count value is carried in a virtual local area network (VLAN) tag added to the packet.

* * * * *